(12) United States Patent
Kang et al.

(10) Patent No.: US 12,130,130 B2
(45) Date of Patent: Oct. 29, 2024

(54) TAPE MEASURE HAVING LIGHT EMITTING DEVICE

(71) Applicant: KOMELON CORPORATION, Busan (KR)

(72) Inventors: Dong Hun Kang, Busan (KR); Nam Hoon Kang, Busan (KR); Seok Jun An, Busan (KR); Bum Hun Park, Busan (KR); Baek Cheon Shin, Busan (KR); Sang Bo Jeon, Busan (KR)

(73) Assignee: KOMELON CORPORATION, Busan (KR)

( * ) Notice: Subject to any disclaimer, the term of this patent is extended or adjusted under 35 U.S.C. 154(b) by 282 days.

(21) Appl. No.: 17/615,767

(22) PCT Filed: Oct. 23, 2020

(86) PCT No.: PCT/IB2020/059978
§ 371 (c)(1),
(2) Date: Dec. 1, 2021

(87) PCT Pub. No.: WO2021/084394
PCT Pub. Date: May 6, 2021

(65) Prior Publication Data
US 2022/0316850 A1   Oct. 6, 2022

(30) Foreign Application Priority Data

Oct. 30, 2019 (KR) .......................... 10-2019-0136306

(51) Int. Cl.
*G01B 3/1041* (2020.01)
*F21V 23/00* (2015.01)
(Continued)

(52) U.S. Cl.
CPC .......... *G01B 3/1041* (2013.01); *F21V 23/007* (2013.01); *F21V 33/0084* (2013.01); *G01B 2003/1087* (2013.01)

(58) Field of Classification Search
CPC .......... G01B 3/1041; G01B 2003/1087; G01B 3/1043; G01B 3/1071; G01B 2003/1023;
(Continued)

(56) References Cited

U.S. PATENT DOCUMENTS 2,992,487 A * 7/1961 Miller .................. G01B 3/1041
242/405
4,516,325 A * 5/1985 Cohen .................. G01B 3/1005
33/760
(Continued)

FOREIGN PATENT DOCUMENTS

AU   2017419296 B2 *  9/2023  ........... G01B 11/026
GB      2144842 A  *  3/1985  ........... G01B 3/1005
(Continued)

OTHER PUBLICATIONS

International Search Report for International Application No. PCT/IB2020/059978 dated Jan. 27, 2021.

*Primary Examiner* — Yaritza Guadalupe-McCall
(74) *Attorney, Agent, or Firm* — Kunzler Bean & Adamson

(57) ABSTRACT

A tape measure having a light emitting device includes a housing, a reel received in the housing, and a blade wound on the reel to be extended or retracted through an inlet of the housing, and further includes a first case, a second case coupled with the first case to form the housing, a light emitting portion positioned in front of the center of the reel around the inlet of the housing, and a light emitting circuit portion positioned in the rear side of the center of the reel by facing the light emitting portion, wherein the light emitting circuit portion includes a circuit board disposed on a rear (Continued)

lower side of the housing, and the first case and the second case provide circuit receiving spaces for receiving the circuit board, respectively.

8 Claims, 6 Drawing Sheets

(51) Int. Cl.
*F21V 33/00* (2006.01)
*G01B 3/1084* (2020.01)

(58) Field of Classification Search
CPC ........... G01B 2003/1074; F21V 23/007; F21V 33/0084
See application file for complete search history.

(56) References Cited

U.S. PATENT DOCUMENTS

| | | | | |
|---|---|---|---|---|
| 4,580,347 | A * | 4/1986 | McKnight | G01B 3/11 24/3.12 |
| 4,944,097 | A * | 7/1990 | Kang | G01B 3/1084 33/760 |
| 6,581,296 | B2 * | 6/2003 | Ponce | G01B 3/1084 33/760 |
| 7,174,655 | B1 * | 2/2007 | Gibbons | G01B 3/1084 33/759 |
| 7,260,899 | B2 * | 8/2007 | Jones | G01B 3/1041 33/760 |
| 7,370,433 | B1 * | 5/2008 | Caraway | G01B 3/1084 33/768 |
| 7,536,804 | B2 * | 5/2009 | Chang | G01B 3/1084 33/760 |
| 7,549,235 | B2 * | 6/2009 | Alders | G01B 3/1084 33/760 |
| 8,516,713 | B2 * | 8/2013 | Carl | G01B 3/1041 33/760 |
| 9,267,778 | B2 * | 2/2016 | Burch | G01B 3/1061 |
| 11,988,505 | B2 * | 5/2024 | McKinster | G01B 3/10 |
| 2003/0000099 | A1 * | 1/2003 | Wang | G01B 3/1084 33/760 |
| 2004/0237326 | A1 * | 12/2004 | Wang | G01B 3/1084 33/760 |
| 2007/0107248 | A1 * | 5/2007 | Jones | G01B 3/1041 33/760 |
| 2007/0171630 | A1 * | 7/2007 | Gibbons | G01B 3/1084 362/109 |
| 2009/0307920 | A1 * | 12/2009 | Schrage | G01B 3/1041 33/760 |
| 2013/0185949 | A1 * | 7/2013 | Burch | G01B 3/1061 33/768 |
| 2014/0101948 | A1 * | 4/2014 | Lee | G01B 3/1041 33/2 R |
| 2015/0308807 | A1 * | 10/2015 | Rhoden | G01B 3/1061 33/763 |
| 2022/0316850 | A1 * | 10/2022 | Kang | F21V 23/007 |
| 2023/0076231 | A1 * | 3/2023 | McKinster | G01B 3/1084 |

FOREIGN PATENT DOCUMENTS

| | | | | |
|---|---|---|---|---|
| JP | 10-332301 | | 12/1998 | |
| JP | 3298843 | B2 | 7/2002 | |
| JP | 2003042701 | | 2/2003 | |
| JP | 2005195611 | | 7/2005 | |
| JP | 2021503592 | A * | 2/2021 | |
| WO | WO-2007057656 | A1 * | 5/2007 | ........... G01B 3/1084 |
| WO | WO-2021084394 | A1 * | 5/2021 | ........... F21V 23/007 |

* cited by examiner

[FIG. 1]
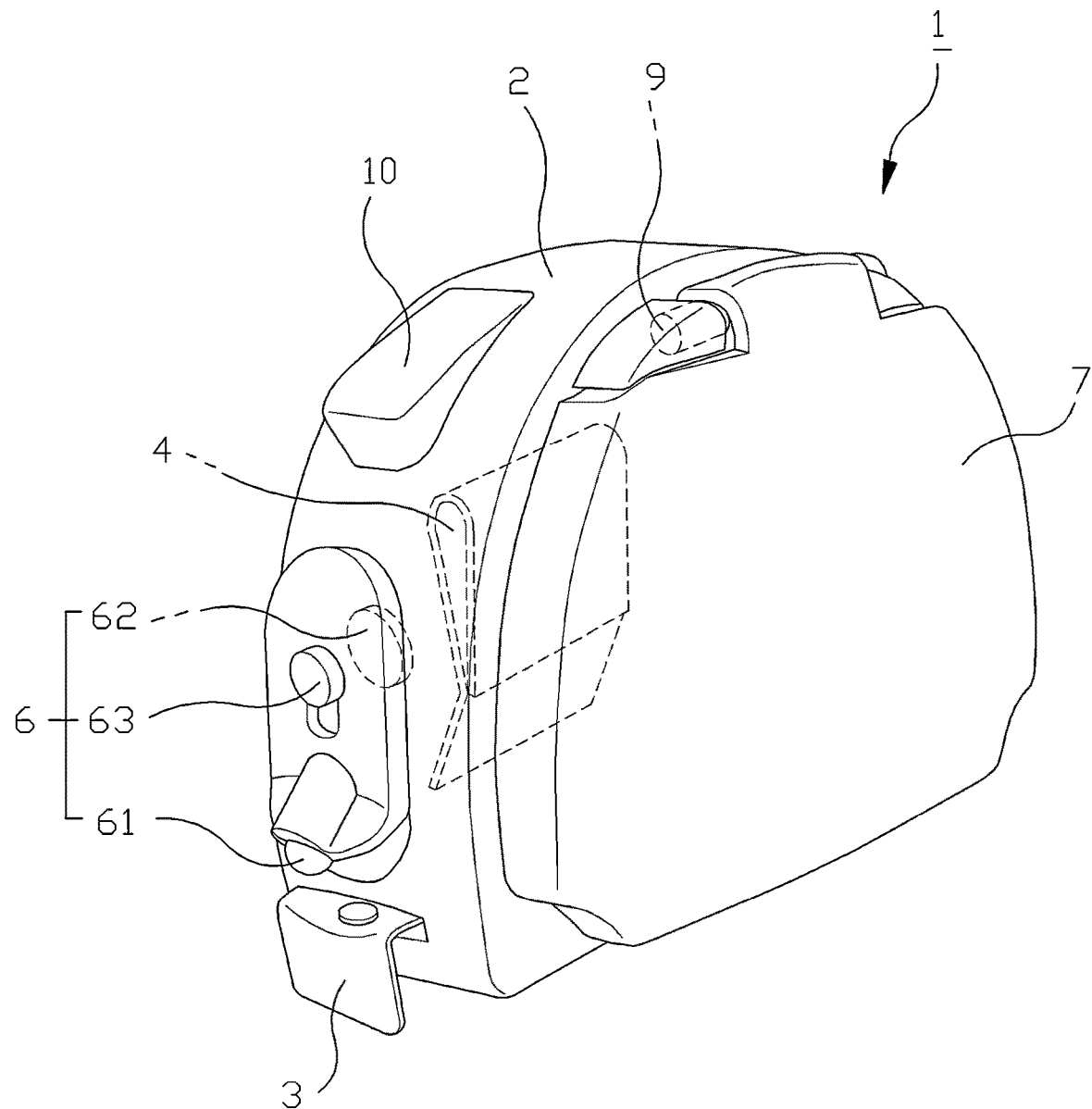

[FIG. 2]
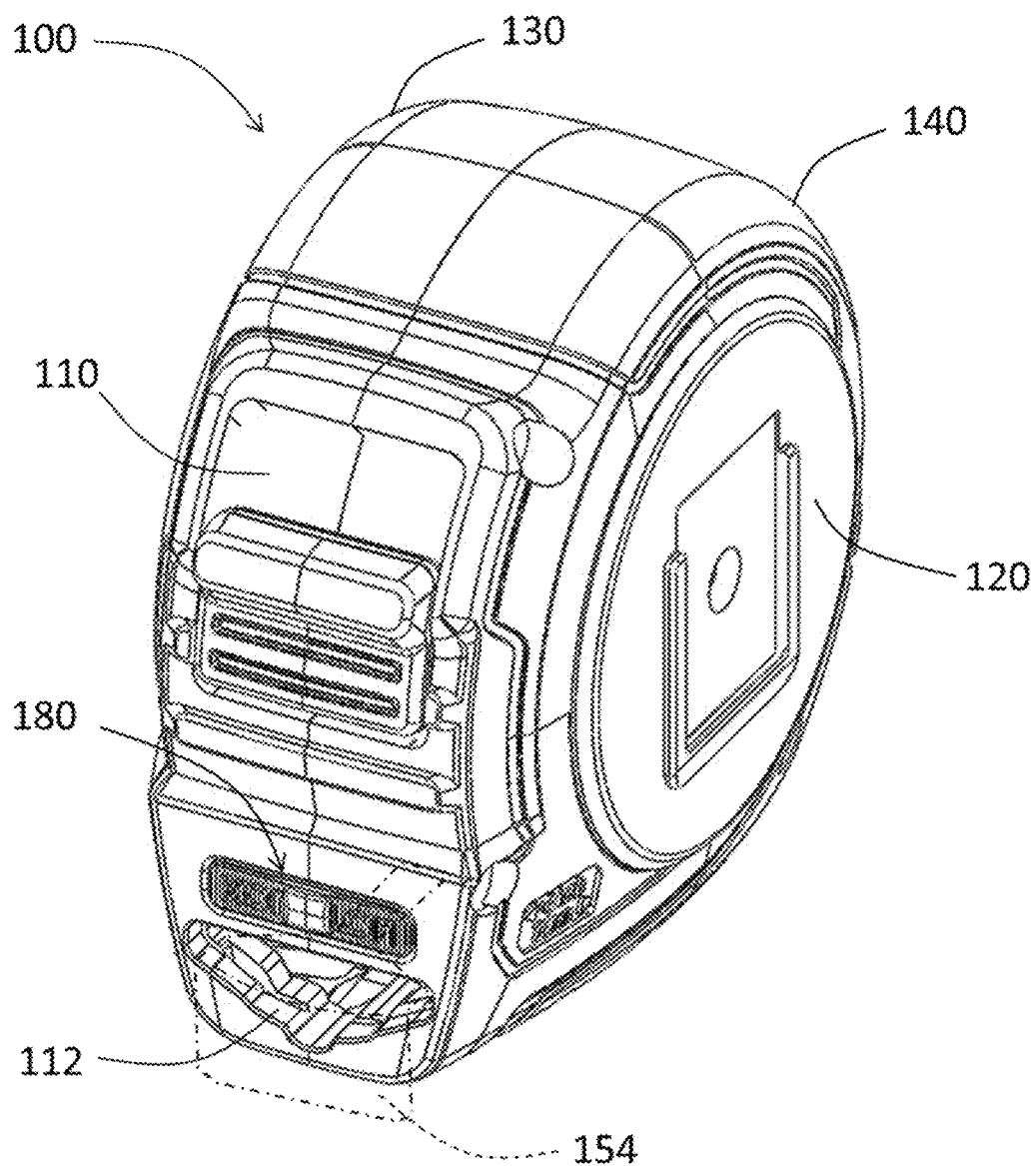

[FIG. 3]
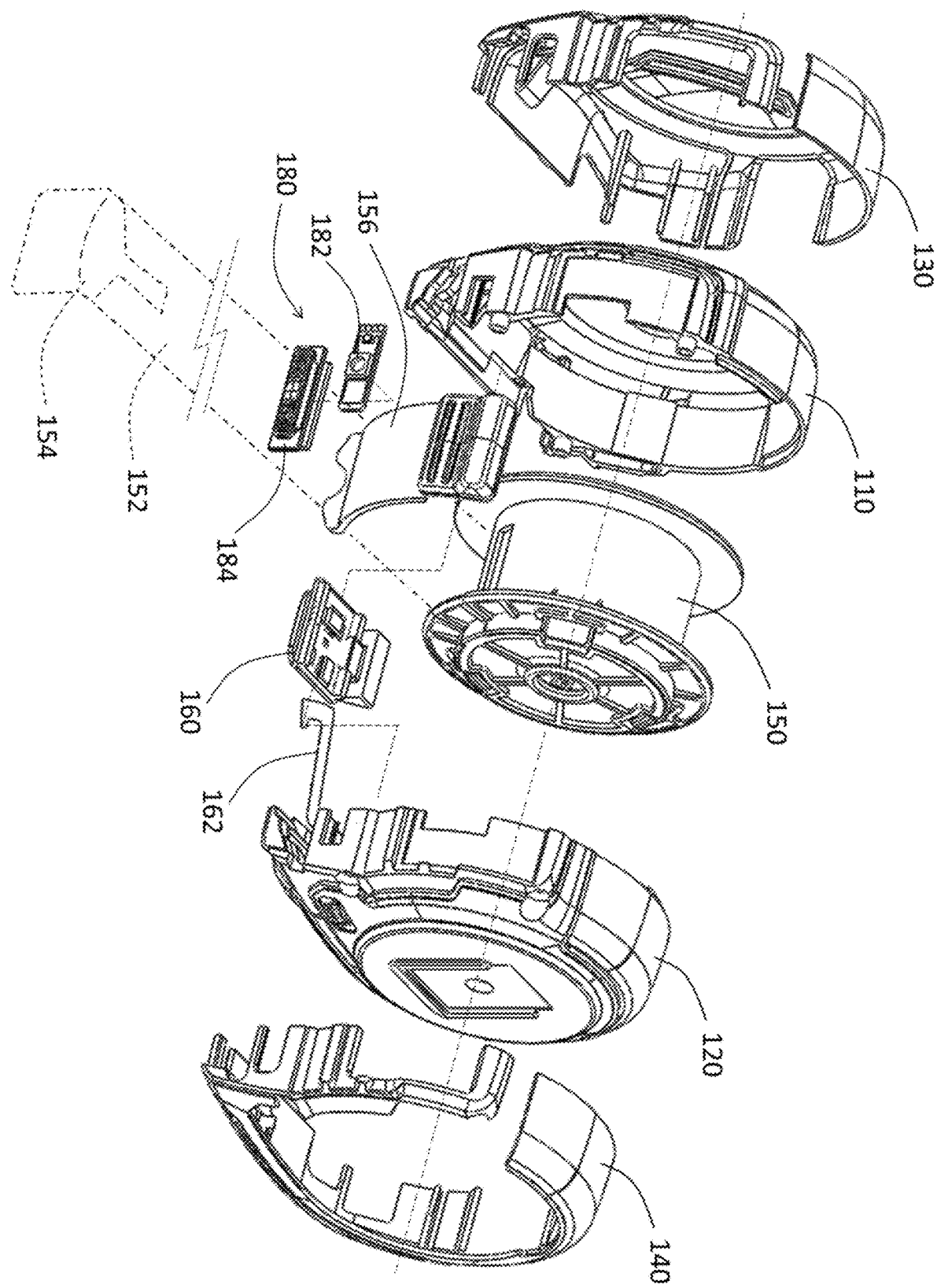

[FIG. 4]
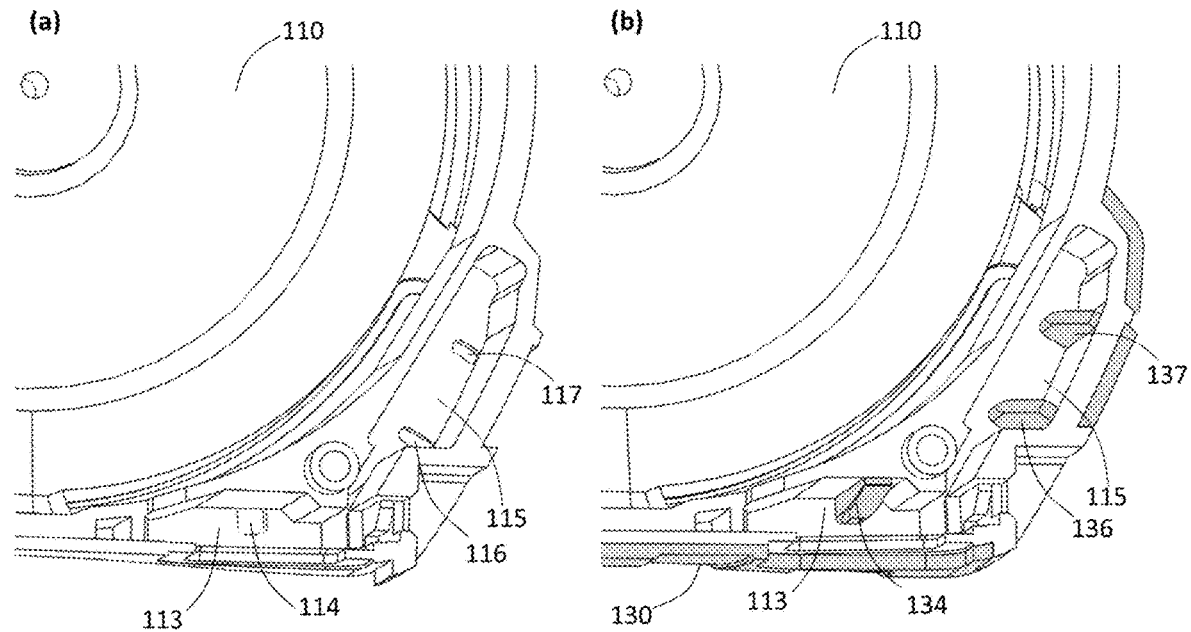
[FIG. 5]
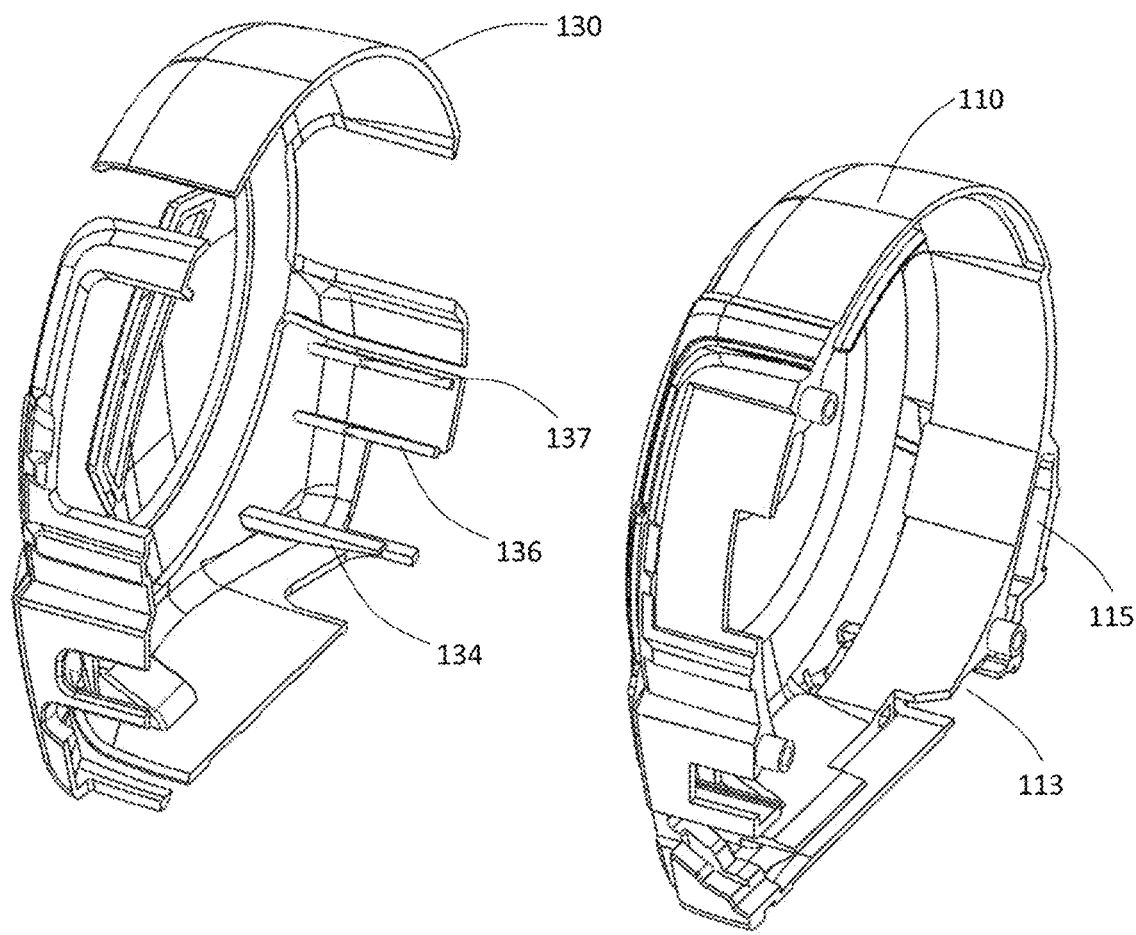

[FIG. 6]
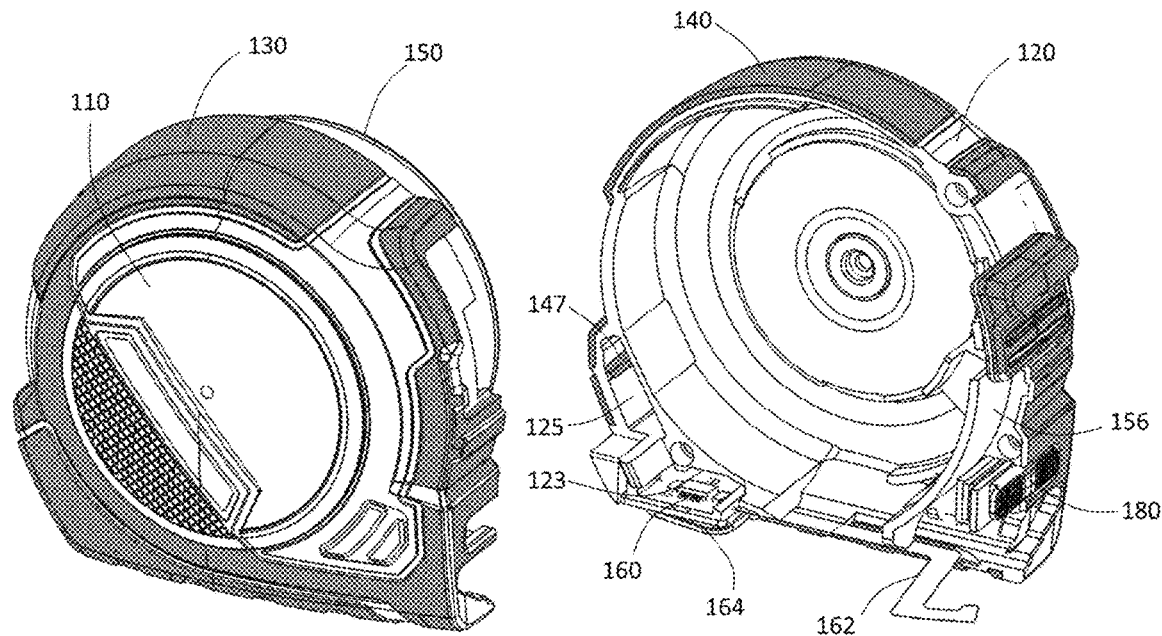
[FIG. 7]
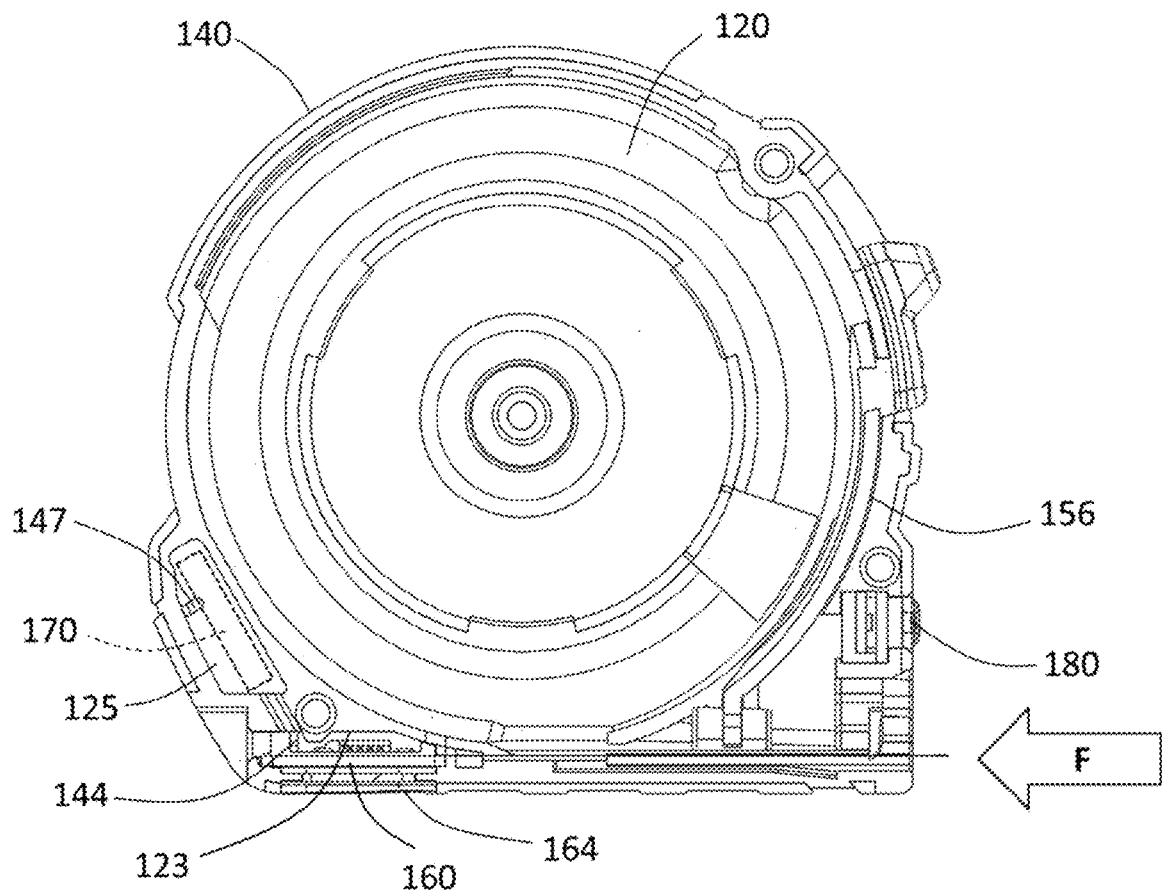

[FIG. 8]
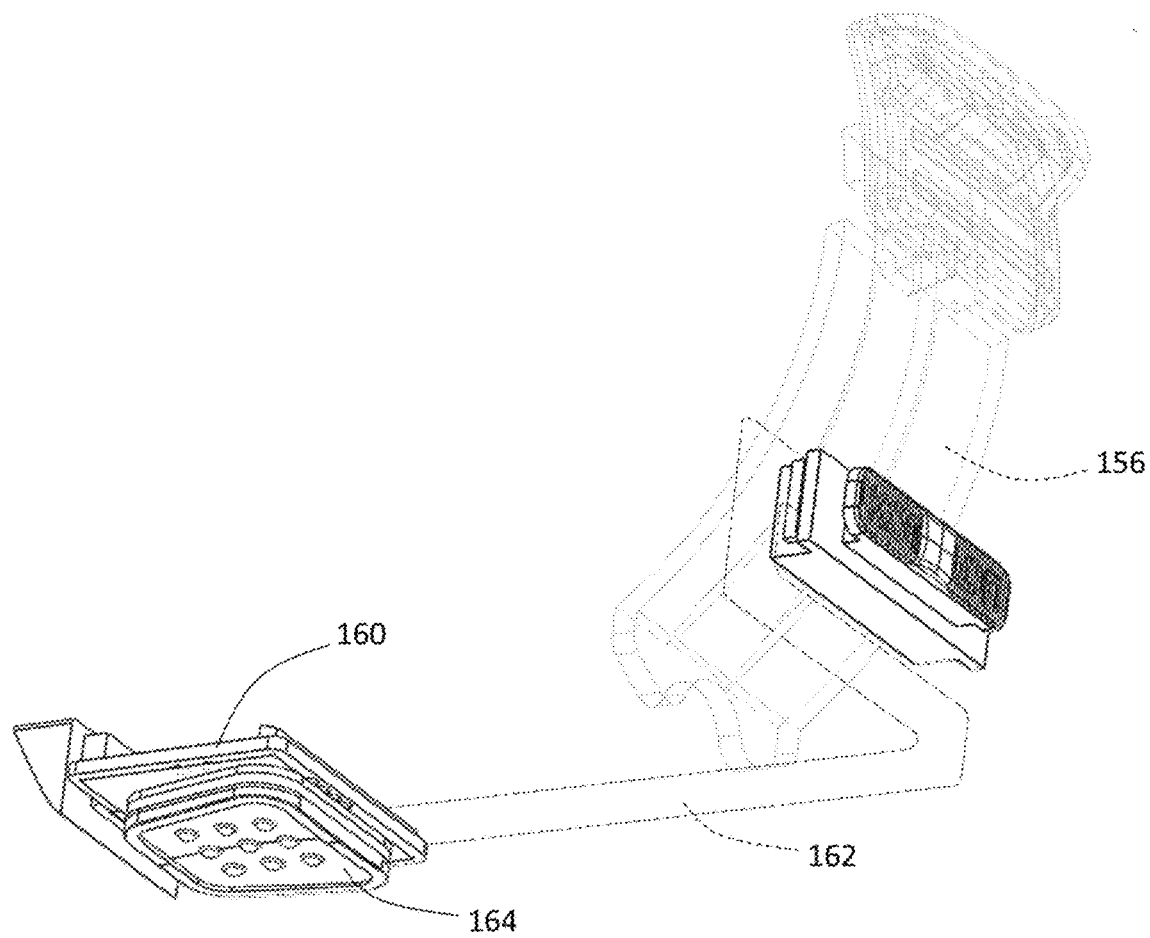

TAPE MEASURE HAVING LIGHT EMITTING DEVICE

TECHNICAL FIELD

The present invention relates to a tape measure, and more particularly, to a tape measure having a light emitting device capable of being used even in a dark environment and maintaining a long life by protecting an internal circuit even in repeated impacts.

BACKGROUND ART

A typical tape measure includes a housing, a reel elastically supported inside the housing, a blade wound on the reel in a coil form, and an end hook coupled to an end of the blade. A user draws out the blade from the end to which the end hook is coupled for measurement and draws out the blade by a desired length to measure a length or distance of an object to be measured.

Further, the elastically operating reel includes a clockwork spring and a bobbin for receiving the clockwork spring and is provided in a state in which the blade is wound on an outer surface of the bobbin and drawn out to the housing, and the blade drawn out by restoration force of the clockwork spring may return in a winding direction on the bobbin.

In this regard, in Korean Utility Model Registration No. 402261, there is disclosed a multifunctional tape measure having a lighting means, and FIG. 1 is a perspective view for describing a tape measure having a lighting means in the related art.

Referring to FIG. 1, an inlet from which a blade and a hook 3 are drawn out is formed on the front surface of a housing in a tape measure 1 and a light emitting portion 61, a battery 62, and a switch 63 are provided directly above the inlet. The user may press the switch 63 to supply power to the light emitting portion 61, and the user may check the dimensions indicated on the blade even in a dark environment.

However, when the user presses a button 10 for releasing a brake in the tape measure 1, the blade and the hook 3 are rapidly returning to the housing to hit the inlet by a large impact. In an existing tape measure consisting of only a mechanical structure, although the hook 3 is impacted, the inlet is not greatly influenced, but in the illustrated tape measure 1, since a circuit including an electric contact is included, the fault of the light emitting means may be easily issued.

Further, in the tape measure 1, although the light emitting portion 61, the battery 62, and the switch 63 are just illustrated, a substantially minimal circuit board needs to be added, and thus, in the tape measure to maintain a compact size, it is difficult to design a substantial structure by only a structure illustrated in Korean Utility Model Registration No. 402261.

[Disclosure]

Technical Problem

The present invention provides a tape measure having a light emitting device that improves durability in consideration of repeated impacts.

The present invention provides a tape measure having a light emitting device capable of forming a stable structure without increasing the number of processes by maximally using a general manufacturing process of the tape measure using an impact absorbing material for improving durability.

The present invention provides a tape measure having a light emitting device capable of maintaining the most compact size as a small size.

Technical Solution

According to an exemplary embodiment of the present invention for achieving the objects of the present invention, a tape measure having a light emitting device includes a housing, a reel received in the housing, and a blade wound on an outer surface of the reel and drawn out or recovered from an inlet of the housing, and further includes a first case, a second case coupled with the first case to form the housing, a light emitting portion positioned in front of the center of the reel around the inlet of the housing, and a light emitting circuit portion positioned in the rear side of the center of the reel by facing the light emitting portion.

The light emitting circuit portion may include a circuit board disposed on a rear lower side of the housing, and the first case and the second case may provide circuit receiving spaces for receiving the circuit board, respectively.

The circuit receiving space may include a first impact absorbing portion for protecting the circuit board. According to an embodiment, a first elastic introduction hole connecting the circuit receiving space and the outside may be formed in at least one of the first case and the second case, and a part of at least one of a first elastic layer formed integrally on the outer surface of the first case and a second elastic layer formed integrally on the outer surface of the second case may be extended and formed to pass through the first elastic introduction hole to provide a first impact absorbing portion supporting an upper surface, a lower surface, or a rear surface of the circuit board.

Here, in the first impact absorbing portion, a length of the extended portion in the circuit receiving space may be greater than a thickness of the first elastic introduction hole.

The light emitting circuit portion may include a switch which is positioned below the circuit board and exposed to the outside from the housing and a battery formed adjacent to the circuit board.

Separately from the circuit receiving space, the first case and the second case may include battery receiving spaces for receiving the battery, respectively, and even in at least one of the first case and the second case, a second elastic introduction hole connecting the battery receiving space and the outside may be formed.

A part of at least one of the first elastic layer and the second elastic layer may be extended and formed to pass through the second elastic introduction hole to provide a second impact absorbing portion supporting an upper surface, a lower surface, or a rear surface of the battery.

In the second impact absorbing portion, a length of the extended portion in the battery receiving space may be greater than a thickness of the second elastic introduction hole, and in the process of forming the first elastic layer or the second elastic layer, the first impact absorbing portion or the second impact absorbing portion may be formed simultaneously.

The first elastic layer and the second elastic layer may be formed for protecting the outer surface of the tape measure, but an impact absorbing structure for protecting an internal circuit may be formed together by forming the first impact absorbing portion or the second impact absorbing portion together while forming the elastic layers.

Through this process, it is not necessary to form an impact absorbing portion separately in the circuit receiving space and the battery receiving space, and in the process of doubly forming the elastic layer after case injection, the elastic layer may be formed while elastic rubber is introduced in the circuit receiving space and the battery receiving space through the elastic introduction hole.

According to an exemplary embodiment of the present invention for achieving the objects of the present invention, a tape measure having a light emitting device includes a housing, a reel received in the housing, and a blade wound on an outer surface of the reel and drawn out or recovered from an inlet of the housing, and further includes a first case, a second case coupled with the first case to form the housing, a light emitting portion positioned in front of the center of the reel around the inlet of the housing, and a light emitting circuit portion positioned in the rear side of the center of the reel by facing the light emitting portion, wherein the first case and the second case may provide circuit receiving spaces for receiving the circuit board, respectively, and a first elastic introduction hole connecting the circuit receiving space and the outside may be formed in at least one of the first case and the second case.

A part of at least one of a first elastic layer formed integrally on the outer surface of the first case and a second elastic layer formed integrally on the outer surface of the second case may be extended and formed to pass through the first elastic introduction hole to provide a first impact absorbing portion supporting an upper surface, a lower surface, or a rear surface of the circuit board in the circuit receiving space.

In the first impact absorbing portion, a length of the extended portion in the circuit receiving space may be greater than a thickness of the first elastic introduction hole.

Advantageous Effects

According to the present invention, in the tape measure, the light emitting portion and the light emitting circuit portion are separated forward and backward based on the center of the reel to mitigate the impact applied to the circuit portion.

Further, in the present invention, the impact absorbing portion for improving durability may be used in a receiving space for including the circuit portion, but the impact absorbing portion is not separately inserted, but is formed together inside the receiving space while forming an elastic layer on an outer surface of the case, and thus there is no need to increase the manufacturing process.

Further, since the light emitting portion including the light emitting device and the circuit portion for power and control are separated forward and backward and installed, even if the light emitting function is mounted, the volume of the tape measure is not increased and the most compact size may be maintained.

DESCRIPTION OF DRAWINGS

FIG. 1 is a perspective view for describing a tape measure having a lighting means in the related art.

FIG. 2 is a perspective view of a tape measure having a light emitting device according to an embodiment of the present invention.

FIG. 3 is an exploded perspective view for describing an internal structure of the tape measure of FIG. 2.

FIG. 4 is a partially enlarged perspective view for describing a process of forming a first elastic layer and an impact absorbing portion at the same time in a first case in the tape measure of FIG. 2.

FIG. 5 is an exploded perspective view for describing a coupling relation between the first case and the first elastic layer formed integrally.

FIG. 6 is an exploded perspective view for describing an assembly process of a light emitting portion and a light emitting circuit portion in the tape measure of FIG. 2.

FIG. 7 is a front view for describing a light emitting portion and a light emitting circuit portion which are mounted in a second case of FIG. 6.

FIG. 8 is a bottom perspective view for describing connection of the light emitting portion and the light emitting circuit portion.

MODES FOR THE INVENTION

Hereinafter, preferred embodiments of the present invention will be described in detail with reference to the accompanying drawings, but the present invention is not limited or restricted to the embodiments. For reference, in the description, like reference numerals substantially refer to like elements, which may be described by citing contents disclosed in other drawings under such a rule and contents determined to be apparent to those skilled in the art or repeated may be omitted.

FIG. 2 is a perspective view of a tape measure including a light emitting device according to an embodiment of the present invention, FIG. 3 is an exploded perspective view for describing an internal structure of the tape measure of FIG. 2, FIG. 4 is a partially enlarged perspective view for describing a process of forming a first elastic layer and an impact absorbing portion at the same time in a first case in the tape measure of FIG. 2, FIG. 5 is an exploded perspective view for describing a coupling relation between the first case and the first elastic layer formed integrally, FIG. 6 is an exploded perspective view for describing an assembly process of a light emitting portion and a light emitting circuit portion in the tape measure of FIG. 2, FIG. 7 is a front view for describing a light emitting portion and a light emitting circuit portion which are mounted in a second case of FIG. 6, and FIG. 8 is a bottom perspective view for describing connection of the light emitting portion and the light emitting circuit portion.

Referring to FIGS. 2 to 7, a tape measure 100 according to the embodiment includes a housing formed by coupling of a first case 110 and a second case 120, a reel 150 rotatably mounted inside the housing, and a blade 152 wound on an outer surface of the reel 150 and drawn out through an inlet 112 of the housing.

The reel 150 according to the embodiment is received inside the housing formed by coupling of the first case 110 and the second case 120 and specifically, may include a bobbin on which the blade 152 is wound, and a spring received in the bobbin. The bobbin and the spring may refer to a structure of existing other tape measures.

Specifically, in the embodiment, the spring is provided in a clockwork shape, and an inner end is fixed to a rotation axis of the reel 150, and an outer end is fixed to the end of the blade 152. Thus, the spring continuously provides a force for winding the blade 152, and the blade 152 drawn out to the outside of the housing may return to the inside through the inlet 112 of the housing, and may be wound on the outer surface of the bobbin.

The tape measure may include the blade 152 capable of measuring 3.5 m, 5.5 m, and the like, depending on a measurable maximum length, and may be provided in various types depending on a material, a width, or the like of the blade 152.

Referring to the drawings, a first elastic layer 130 made of a rubber material may be formed on the outer surface of the first case 110 by double injection or compression molding and a second elastic layer 140 may be formed even on outer surface of the second case 120 in a similar manner. The first elastic layer 130 and the second elastic layer 140 may protect the surface of the case from the outside and absorb the impact that is applied from the ground even if the tape measure falls down, and prevent the case from sliding from a user's hand.

In addition, the tape measure may include a light emitting portion 180 provided using an LED or the like to the upper portion of the inlet 112 to provide light toward the front surface of the housing from the light emitting portion 180 when pressing a switch 164 to be described below.

However, in the embodiment, the light emitting portion 180 including an LED device and the like may be positioned in front of the center of the reel 150 around the inlet 112 of the housing, while a circuit board 160 and a battery 170 configuring a light emitting circuit portion may be positioned in the rear of the center of the reel 150 by facing the light emitting portion 180.

The light emitting circuit portion may include a circuit board 160 disposed on the rear lower side of the housing, a switch 164 positioned below the circuit board 160 to be exposed to the outside from the housing, and a battery 170 formed adjacent to the circuit board 160.

Further, the housing may include a circuit receiving space for protecting the circuit board 160 from an external environment and other elements in the tape measure, and to this end, the first case 110 and the second case 120 may include circuit receiving portions 113 and 123 receiving the circuit board 160 and opened downward in response to the switch 164, respectively.

Further, first impact absorbing portions 134 and 144 for protecting the circuit board 160 are formed on one side or both sides of the circuit receiving portions 113 and 123 on the upper portion of the circuit receiving space.

The housing may include a battery receiving space which is separated from the circuit receiving space as a separate space and protects the battery 170 from an external environment and other elements in the tape measure. To this end, the first case 110 and the second case 120 may include battery receiving portions 115 and 125 for receiving the battery 170, respectively.

Further, second impact absorbing portions 136, 137, and 147 for protecting the battery 170 are formed on one side or both sides of the battery receiving portions 115 and 125 rearward of the battery receiving space.

In the embodiment, the light emitting portion 180 is necessarily disposed in front of the housing, but the light emitting circuit portion is positioned on the rear side based on the center of the reel 150 to experience a decreased state of the impact that occurs during the return of the hook 154.

Further, since the light emitting portion 180 including the light emitting device, the circuit board 160 for power and control, and the battery 170 are separated forward and backward and installed, even if the light emitting function is mounted, the volume of the tape measure is not greatly increased and the most compact size may be maintained.

Further, in the present invention, the impact absorbing portion for improving durability may be used in a receiving space for including the circuit portion, but the impact absorbing portion is not separately inserted, but may be formed simultaneously inside the receiving space while forming an elastic layer on an outer surface of the case.

Referring to FIG. 4A, in the first case 110 while the first elastic layer is not formed, a circuit receiving portion 113 for receiving a part of the circuit board 160 and a battery receiving portion 115 for receiving a part of the battery 170 are formed.

Then, while the first elastic layer 130 for protecting the outer surface of the first case 110 is formed, the first impact absorbing portion 134 and the second impact absorbing portions 136 and 137 may be formed together through elastic introduction holes 114, 116, and 117, and the first impact absorbing portion 134 and the second impact absorbing portions 136 and 137 may be formed at once without a need to add a separate manufacturing process (FIG. 4B).

Unlike FIG. 5, actually, the first elastic layer 130 is formed integrally on the outer surface of the first case 110 and can not be cleanly separated in reality. However, as virtually illustrated, as a result, the first impact absorbing portion 134 and the second impact absorbing portions 136 and 137 are integrally provided in the first elastic layer 130 in a protruding form elongated toward the inside, and may serve to stably support the upper surface of the circuit board 160 and the rear surface of the battery 170, respectively.

Referring to FIG. 6, the circuit board 160 and the light emitting portion 180 are partially received even in the circuit receiving portion 123 and the battery receiving portion 125 of the second case 120, and the circuit receiving portions 113 and 123 and the battery receiving portions 115 and 125 of the both sides are disposed adjacent to each other to form each connected receiving space.

Then, the circuit board 160 and the light emitting portion 180 may be connected to a flexible printed circuit board, i.e., FPCB 162, and may receive the control and power required for light emission.

The second impact absorbing portion 147 may be formed together with the second elastic layer 140 even in the battery receiving portion 125 of the second case 120. Of course, the first impact absorbing portion 144 may be formed on the circuit receiving portion 123 of the second case 120 and may stably support the upper surface of the circuit board 160.

As illustrated in FIG. 8, the switch 164 may be disposed on a lower surface of the circuit board 160, and the switch 164 may be exposed to the lower rear side of the housing. Accordingly, the user may press the switch 164 using one of fingers for holding the tape measure, and may control the light to be emitted from the light emitting portion 180 whenever the user wants.

As described above, the present invention has been described with reference to the embodiments of the present invention. However, it will be appreciated by those skilled in the art that various modifications and changes of the present invention can be made without departing from the spirit and the scope of the present invention which are defined in the appended patent claims.

The invention claimed is:

1. A tape measure having a light emitting device, which comprises a housing, a reel received in the housing, and a blade wound on the reel to be extended or retracted through an inlet of the housing, the tape measure comprising:
   a first case;
   a second case coupled with the first case to form the housing;
   a light emitting portion positioned in front of the center of the reel around the inlet of the housing; and
   a light emitting circuit portion positioned in the rear side of the center of the reel by facing the light emitting portion, wherein the light emitting circuit portion includes a circuit board disposed on a rear lower side of the housing, and the first case and the second case provide circuit receiving spaces for receiving the circuit board, respectively, wherein a first elastic introduction hole connecting the circuit receiving space and the outside is formed in at least one of the first case and the second case, and wherein a part of at least one of a first elastic layer formed integrally on the outer surface of the first case and a second elastic layer formed integrally on the outer surface of the second case is extended and formed to pass through the first elastic introduction hole to provide a first impact absorbing portion supporting an upper surface, a lower surface, or a rear surface of the circuit board.

2. The tape measure of claim 1, wherein in the first impact absorbing portion, a length of the extended portion in the circuit receiving space is greater than a thickness of the first elastic introduction hole.

3. The tape measure of claim 1, wherein the light emitting circuit portion further comprises a switch which is positioned below the circuit board and exposed to the outside from the housing and a battery formed adjacent to the circuit board.

4. The tape measure of claim 3, wherein the first case and the second case include battery receiving spaces for receiving the battery, respectively, and even in at least one of the first case and the second case, a second elastic introduction hole connecting the battery receiving space and the outside is formed, and a part of at least one of the first elastic layer and the second elastic layer is extended and formed to pass through the second elastic introduction hole to provide a second impact absorbing portion supporting an upper surface, a lower surface, or a rear surface of the battery.

5. The tape measure of claim 4, wherein in the second impact absorbing portion, a length of the extended portion in the battery receiving space is greater than a thickness of the second elastic introduction hole.

6. The tape measure of claim 4, wherein in the process of forming the first elastic layer or the second elastic layer, the first impact absorbing portion or the second impact absorbing portion is formed simultaneously.

7. A tape measure having a light emitting device, which comprises a housing, a reel received in the housing, and a blade wound on the reel to be extended or retracted through an inlet of the housing, the tape measure comprising:

a first case;

a second case coupled with the first case to form the housing;

a light emitting portion positioned in front of the housing; and a light emitting circuit portion including a circuit board provided in the housing, wherein the first case and the second case provide circuit receiving spaces for receiving the circuit board, respectively, a first elastic introduction hole connecting the circuit receiving space and the outside is formed in at least one of the first case and the second case, and a part of at least one of a first elastic layer formed integrally on the outer surface of the first case and a second elastic layer formed integrally on the outer surface of the second case is extended and formed to pass through the first elastic introduction hole to provide a first impact absorbing portion supporting an upper surface, a lower surface, or a rear surface of the circuit board in the circuit receiving space.

8. The tape measure of claim 7, wherein in the first impact absorbing portion, a length of the extended portion in the circuit receiving space is greater than a thickness of the first elastic introduction hole.

* * * * *